June 10, 1924.

A. A. BULL 1,497,009

MOTOR OILING SYSTEM

Filed Dec. 13, 1920    2 Sheets-Sheet 1

Witness:
G. L. Terre

Inventor
Arthur A. Bull
By his Attorneys
Blackmore, Spencer & Flint

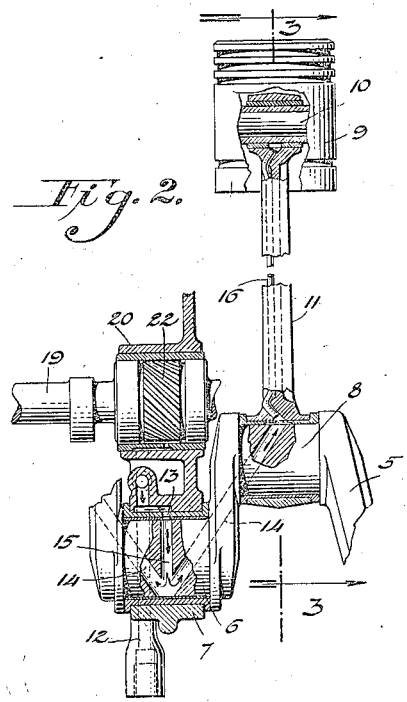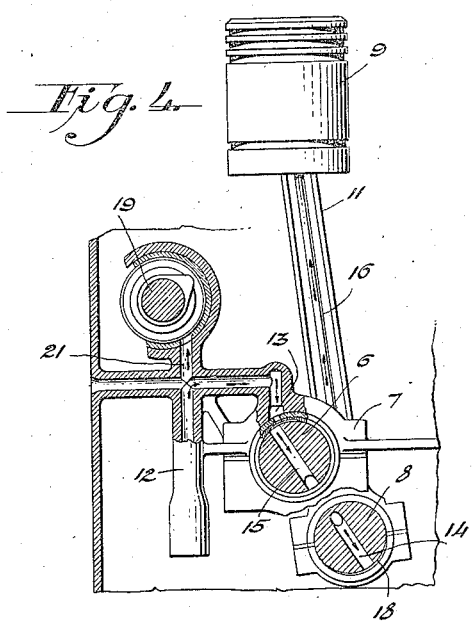

Patented June 10, 1924.

1,497,009

UNITED STATES PATENT OFFICE.

ARTHUR A. BULL, OF DETROIT, MICHIGAN, ASSIGNOR TO GENERAL MOTORS CORPORATION, OF DETROIT, MICHIGAN, A CORPORATION OF DELAWARE.

MOTOR OILING SYSTEM.

Application filed December 13, 1920. Serial No. 430,412.

*To all whom it may concern:*

Be it known that I, ARTHUR A. BULL, a subject of the King of Great Britain, and a resident of Detroit, county of Wayne, and State of Michigan, have invented certain new and useful Improvements in Motor Oiling Systems, of which the following is a full, clear, concise, and exact description, such as will enable others skilled in the art to which the invention relates to make and use the same, reference being made therein to the accompanying drawings, which form a part of this specification.

My invention relates to lubricating systems designed especially for use with internal combustion engines to lubricate the crank and wrist pins thereof, and incidentally the main crank shaft bearings of the engine; and the principal object thereof is to provide an improved lubricating system wherein the oil or equivalent lubricant is supplied to the crank and wrist pin bearings just before said bearings are subjected to the maximum load to which they are subjected when the engine is in use, to thereby insure the presence of a film of oil at the bearings in question at the time when they are subjected to the maximum pressure which they are called upon to sustain.

A further object of my invention is to provide an improved lubricating system of the type referred to wherein the quantity of oil necessary to secure effective lubrication is materially reduced by regulating the supply of lubricant to the bearings so that the same will occur just prior to the instant when the bearings have to sustain their greatest load and at a time when the bearings should be the most thoroughly lubricated, and not at other times during the operation of the engine.

With the above and other objects of invention in view, my invention consists in an improved lubricating system illustrated in the accompanying drawings and hereinafter described and claimed; and in such variations and modifications thereof, within the scope of the concluding claims, as will be obvious to those skilled in the art to which my invention relates.

Referring now to the drawings;

Figure 2 is a fragmentary schematic view upon a larger scale and partly in elevation and partly in section illustrating my improved lubricating system.

Figure 4 is a similar view showing the conditions near the end of the down stroke of the piston in question.

Figure 1:
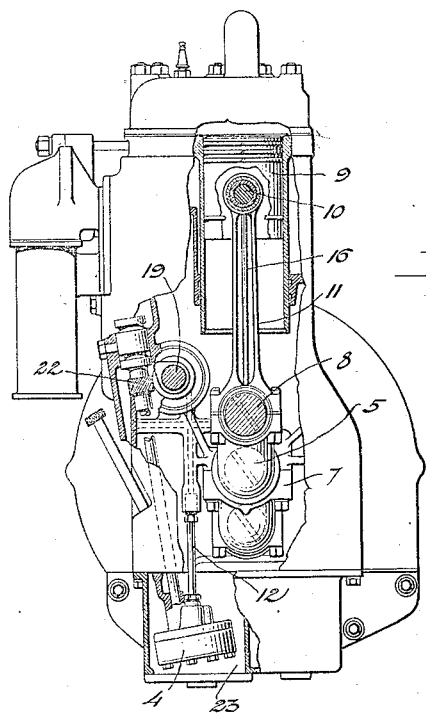
Figure 1 is a view partly in section and partly in elevation showing an internal combustion engine equipped with my improved lubricating system.

Referring to the drawings, the reference numeral 5 designates the crank shaft of an internal combustion or similar single acting engine, and 6 one of two or more crank shaft journals which are supported in suitable bearings supported by the base portion or crank case of the engine; one of said bearings being designated by the reference numeral 7 and the other or others not being shown. The crank shaft is provided with one or more crank pins 8; and the reference numeral 9 designates a piston of the engine equipped with my improved lubricating system and which is ordinarily one having a plurality of working cylinders, although this is a non-important feature as my improved lubricating system is capable of use with engines of any type or class as regards the number of cylinders present therein. The piston 9 is provided with a wrist pin 10; and the reference numeral 11 designates a connecting rod having crank and wrist pin bearings at its lower and upper ends which are in engagement, respectively, with the crank and wrist pins 8 and 10.

The lubricating system to which my invention relates is of the general type or class in which oil is supplied to the bearings to be lubricated under pressure, as by the use of a suitable pump 4; and the reference numeral 12 designating a suitable conduit through which the oil is thus supplied under pressure and which conduit leads to a discharge or outlet port 13 formed in the bearing 7 of the crank shaft and supplies oil to the journal bearing 7 of the said shaft.

The reference numeral 14 designates an oil supply passage or conduit formed within the crank shaft, and the inlet end of which, referring to Figure 2, is adapted to communicate with the outlet port 13 twice during each rotation of the crank shaft; said conduit communicating at its inner end with a transverse passage 15 extending through the crank shaft journal 6 and from which it follows that the upper end of the said passage communicates with the port 13 in one position of the parts, while the lower end of said passage communicates with said port after the crank shaft has advanced throughout one-half a rotation. It therefore follows that the passage or conduit 14 is placed in communication with and receives oil under pressure from the port 13 and supply conduit 12 twice during each rotation of the crank shaft.

The outlet end of the conduit 14 discharges at the bearing surface between the crank pin 8 and the lower end af the connecting rod and supplies oil to the said bearing, and a second oil supply passage 16 leads from the bearing between the connecting rod and the crank pin along the connecting rod and to the wrist pin bearing, and serves to supply oil to said last mentioned bearing.

The location of the oil supply port 13 and the passage 15 which receives oil from said port is such that the ends of said passage communicate in alternation with said port at or about, but slightly before the ends of the up and down stroke of the piston the connecting rod bearings of which are to be lubricated; so that the supply of oil under pressure along the passage 14 and to the bearings to be lubricated occurs near the ends of the up and down strokes of the piston of the rod in question, but slightly before the ends of said strokes.

Figure 3:
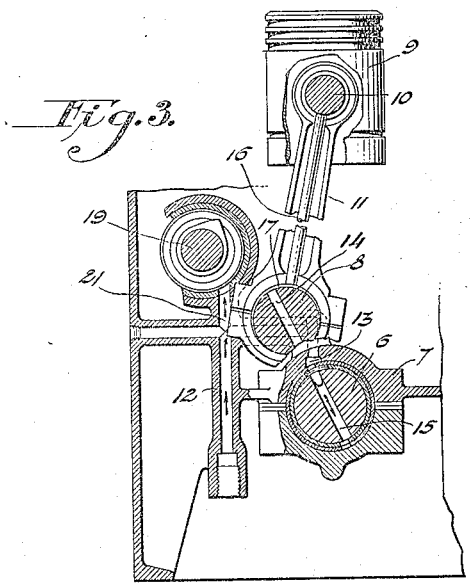
Figure 3 is a sectional view showing the conditions at the lower end of a connecting rod and the crank pin bearing associated therewith when the piston associated with said rod is adjacent the end of its upward movement.

In engines of the type herein contemplated there is of necessity some little looseness at the crank pin bearings in order to provide for the film of oil whereby lubrication is effected and avoid the heating of the bearing. Such being the case, and keeping in mind the effect of the momentum of the moving mass formed by the connecting rod and piston, it will be appreciated that as the piston nears the end of its up stroke and the rectilinear component of the movement of the crank pin approaches zero the connecting rod, due to the momentum of the same and of the piston, tends to continue its movement and to leave the crank pin; the result being, referring to Figure 3, that near the end of the up stroke of the piston the underside of the crank pin bearing will move into engagement with the underside of the crank pin, thus leaving a lune-shaped space or cavity shown much enlarged at 17 at the upper side of the crank pin, or, as otherwise expressed, the momentum of the parts tends to produce a condition such that the looseness between the lower end of the connecting rod and the crank pin is all upon the upper side of the crank pin near the end of the up stroke of the piston.

As hereinbefore explained the transverse passage 15 comes into communication with the discharge port 13 of the oil supply conduit at the end of the up stroke of the piston when the looseness at the crank pin bearing is localized at the upper side of the crank pin, from which it follows that oil will be supplied to the space between the crank pin and connecting rod bearing at or near the end of the upward movement of the piston. The oil thus supplied forms a film between the parts, from which it follows that the bearing referred to receives a fresh supply of lubricant and is copiously lubricated just prior to the beginning of each down stroke of the piston. It therefore follows that in engines operating upon a four stroke cycle a quantity of lubricant is supplied to the crank and wrist pin bearings just before the engine begins each of its working strokes during which the piston is subjected to its maximum load and the crank shaft bearing to its maximum pressure; while oils will likewise be supplied to the crank and wrist pin bearings adjacent the ends of the compression strokes, particularly at high speeds when the momentum of the piston and connecting rod becomes sufficient in magnitude to overcome the resistance offered by the charge being compressed.

As the piston nears the end of its down stroke the momentum thereof and of the connecting rod results in the looseness between the rod bearing and crank pin being localized at the underside of the bearing, as shown exaggerated at 18 in Figure 4. At this time, however, the transverse passage 15 is again in communication with the oil supply port 13 and oil under pressure flows through said passage and through the conduit 14 into the space aforesaid, thus lubricating the bearing in question just before the piston begins its up stroke.

It will be appreciated that at the time above contemplated the upper side of the crank pin is in contact with the upper side of the connecting rod bearing and acts to prevent the flow of oil from the crank pin bearing through the conduit 16 and to the wrist pin; from which it follows that at the ends of the down strokes of the piston the oil is supplied to the crank pin bearing only, and that little or no oil is supplied to the wrist pin bearing at the phase of the cycle in question.

When the piston is in its down position the engine is just beginning either its exhaust or its compression stroke, so that lubricant is supplied to the crank pin just before the bearing thereof is subjected to the work due to the forcing of the burned gases out of the cylinder or just before the said pin is subjected to the greater work incident to the compression of a charge within the working cylinder. In either case, however, the pressure upon the wrist pin is reduced as regards the pressure to which it is subjected at the beginning of the working stroke so that the omission to supply oil to the wrist pin at the ends of the down strokes is advantageous rather than otherwise, as considerable oil is thus saved.

Regarding both up and down strokes it will be appreciated that oil is supplied to the crank pin bearing twice during each rotation of the crank shaft, and at times just prior to the times when said crank pin is subjected to high pressures incident to the operation of the engine; and that oil is supplied to both the crank and wrist pin bearings at the ends of the up strokes of the piston just before the maximum pressure to which the bearings are subjected occurs.

The valve operating shaft 19 of the engine is supported in suitable bearings 20 provided in the crank case thereof, which bearings are supplied with oil through a branch conduit 21 leading from the oil supply conduit 12 in the embodiment of my invention illustrated; and duplicate conduits or passages 14 are provided in the crank shaft in order to supply oil to two crank pin bearings disposed one upon either side of the journal 6 whereby the crank shaft is supported in the bearings provided for it. The oil pump 4 is operated from the valve shaft 19 through spiral gearing at 22 and is located within a chamber 23 beneath the base or crank case of the engine. These and other oil pump features are not referred to in detail herein as they form no part of the invention to which this present application relates.

Having thus described and explained my invention, I claim and desire to secure by Letters Patent:

1. In an engine lubricating system, a crank shaft having a crank pin; a crank shaft bearing wherein said crank shaft is supported; an oil supply conduit leading to said crank shaft bearing and communicating therewith through a port which is located to one side of the line of travel of the engine piston; a piston having a wrist pin; a connecting rod having crank and wrist pin bearings engaging said crank and wrist pins; an oil supply conduit leading from the port aforesaid through said crank shaft and to said crank pin bearing and so located as to communicate with said port when said piston is near, but before it reaches the ends of its up and down strokes, and to be out of communication with said port at other times; and an oil supply conduit leading from said crank pin bearing along said connecting rod and to said wrist pin bearing.

2. In an engine lubricating system, a crank shaft having a crank pin; a crank shaft bearing wherein said crank shaft is supported; an oil supply conduit leading to said crank shaft bearing and communicating therewith through a port which is located to one side of the line of travel of the engine piston; a piston having a wrist pin; a connecting rod connected with said wrist pin and having a crank pin bearing engaging said crank pin; and an oil supply conduit leading from the port aforesaid through said crank shaft and to said crank pin bearing and so located as to communicate with said port when said piston is near, but before it reaches the ends of its up and down strokes, and to be out of communication with said port at other times.

3. In an engine lubricating system, a crank shaft having a crank pin; a crank shaft bearing wherein said crank shaft is supported; an oil supply conduit leading to said crank shaft bearing and communicating therewith through a port; a piston having a wrist pin; a connecting rod connected with said wrist pin and having a crank pin bearing engaging said crank pin; and an oil supply passage leading from the port aforesaid to said crank pin bearing and adapted to over-run said port to thereby supply oil to said crank pin bearing when said piston is adjacent but before it reaches the end of its up stroke.

4. In an engine lubricating system, a crank shaft having a crank pin; a crank shaft bearing wherein said crank shaft is supported; a piston having a wrist pin; a connecting rod having crank and wrist pin bearings engaging said crank and wrist pins; means for supplying oil to said crank pin bearing but not to said wrist pin bearing when said piston is near, but before it reaches the end of its down stroke; and means for supplying oil to both said crank and wrist pin bearings when said piston is near, but before it reaches the end of its up stroke.

5. In an engine lubricating system, a crank shaft having a crank pin; a crank shaft bearing wherein said crank shaft is supported; a piston having a wrist pin; a connecting rod having crank and wrist pin bearings engaging said crank and wrist pins; and means for supplying oil to said crank pin bearing when said piston is adjacent but before it reaches the ends of both its up and down strokes and for interrupting the supply of oil to said bearings at other times.

In testimony whereof I affix my signature.

ARTHUR A. BULL.